Sept. 11, 1962 A. P. WATERSON 3,053,280
PILOT OPERATED TRACER VALVE FOR MACHINE TOOLS
Filed April 5, 1961 3 Sheets-Sheet 1

INVENTOR.
ARTHUR P. WATERSON
BY
Kimmel & Crowell
ATTORNEYS.

INVENTOR.
ARTHUR P. WATERSON
BY Kimmel & Crowell
ATTORNEYS.

Sept. 11, 1962 A. P. WATERSON 3,053,280
PILOT OPERATED TRACER VALVE FOR MACHINE TOOLS
Filed April 5, 1961 3 Sheets-Sheet 3

INVENTOR.
ARTHUR P. WATERSON
BY
Kimmel & Crowell
ATTORNEYS.

United States Patent Office 3,053,280
Patented Sept. 11, 1962

3,053,280
PILOT OPERATED TRACER VALVE FOR
MACHINE TOOLS
Arthur P. Waterson, 241 S. 4th St., Dighton, Kans.
Filed Apr. 5, 1961, Ser. No. 100,832
13 Claims. (Cl. 137—622)

This invention relates to a pilot operated tracer valve for controlling the cutting element on a machine tool.

An object of the present invention is to provide a pilot operated tracer valve for machine tools that is smoother in operation than the similar valves now in use.

Another object of the present invention is to provide a pilot operated tracer valve for machine tools which is fool proof in operation in that it may be left in the on position without any damage accruing to same.

A further object of the present invention is to provide a pilot operated tracer valve for machine tools that substantially eliminates turbulence in the operation of the pilot valve itself and the servo valve controlled by same.

An additional object of the present invention is to provide a pilot operated tracer valve for machine tools in which wire drawing in the operation of the valve is approximately eliminated.

Still other objects, advantages and improvements will become apparent from the specification, taken in connection with the accompanying drawings, in which.

Figures 1, 2:
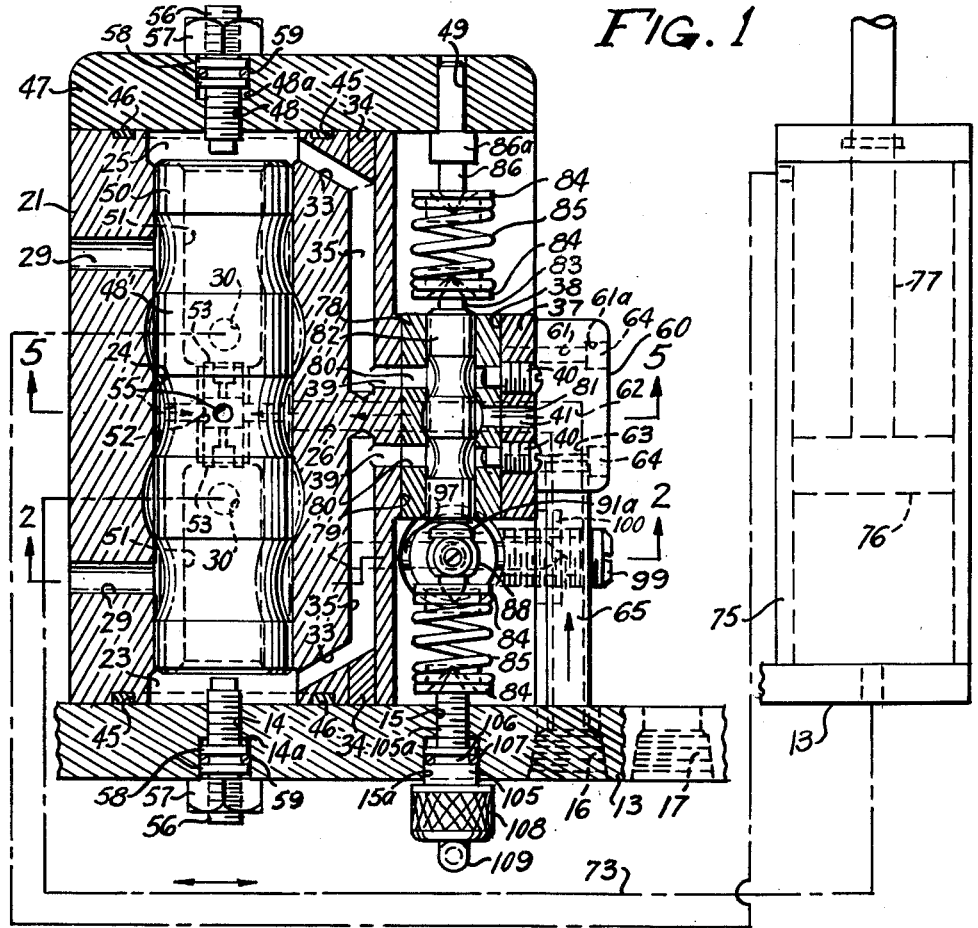
FIGURE 1 is a horizontal sectional view through the pilot valve and the pilot operated tracer valve according to the present invention.
FIGURE 2 is a vertical sectional view taken on the section line 2—2 of FIGURE 1 and looking in the direction of the arrows.

Referring now to the drawings in detail and to FIGURE 1 in particular, the pilot and tracer valves are here shown and they are mounted on a vertically positioned plate 13, which is secured to the upper horizontal plate 10 of the tool slide on a machine tool by bolts 12. The pilot and tracer valves are enclosed in a liquid tight compartment (not shown), which is oil filled and of which the upper horizontal plate 10 of the tool slide forms the bottom. Oil under pressure is supplied to the pilot valve through an inlet conduit (not shown), which extends from a source of oil under pressure such as a pump (also not shown), and is connected at its end into screw threaded hole 16 in the vertical plate 13 in the tool slide. An outlet conduit (not shown) for excess oil may be connected at one end into a similar screw threaded hole 17 in the vertical plate 13 on the tool slide and extends to an oil sump (also not shown). The arrangement of the oil pump, inlet conduit, outlet conduit and oil sump are fully shown in my prior Patent Number 2,691,913.

The servo valve housing is shown at 21. It is secured to the vertical plate 13 on the tool slide by cap screws 43, which are received in suitable screw threaded holes 22 in the valve housing. An end plate 47 is likewise secured to the valve housing 21 by similar screws 43. Lengthwise of the valve housing 21 there is formed an axial bore 24, which has its wall of flattened sinusoidal shape. At the ends of the bore 24 the latter is enlarged in diameter to form chambers 23 and 25. Around these chambers 23 and 25 there are formed in the ends of the valve housing 21 annular grooves 45 in which there are placed sealing rings 46. The latter form liquid tight joints with the vertical plate 13 and the end plate 47, respectively.

Figure 4:
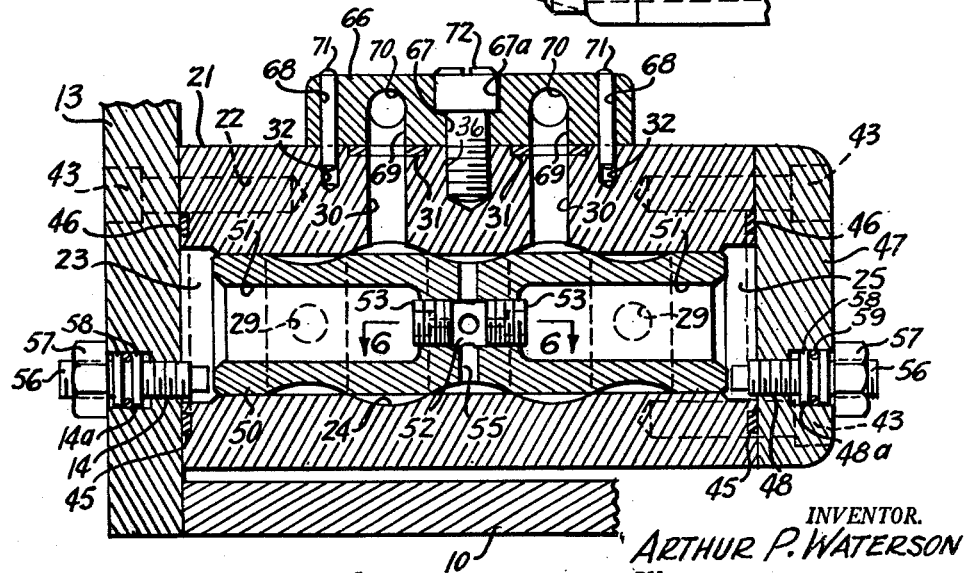
FIGURE 4 is a longitudinal vertical sectional view taken on the section line 4—4 of FIGURE 2 and looking in the direction of the arrows.
Figure 5:
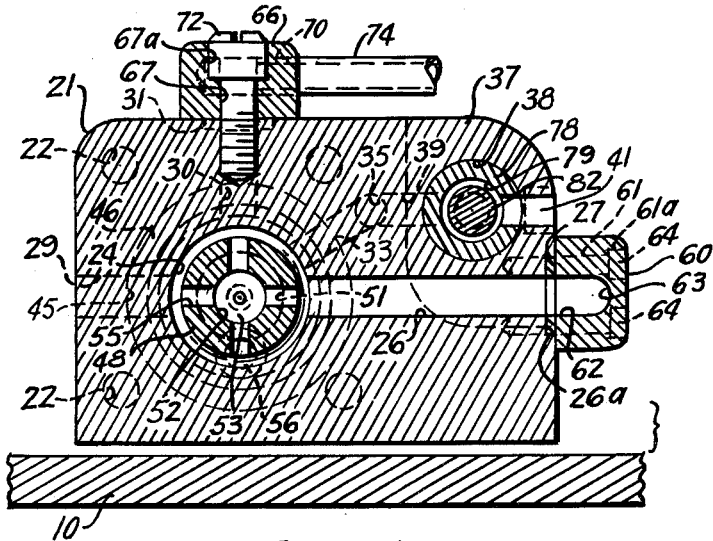
FIGURE 5 is a transverse vertical sectional view, taken on the section line 5—5 of FIGURE 1 and looking in the direction of the arrows.
Figure 6:
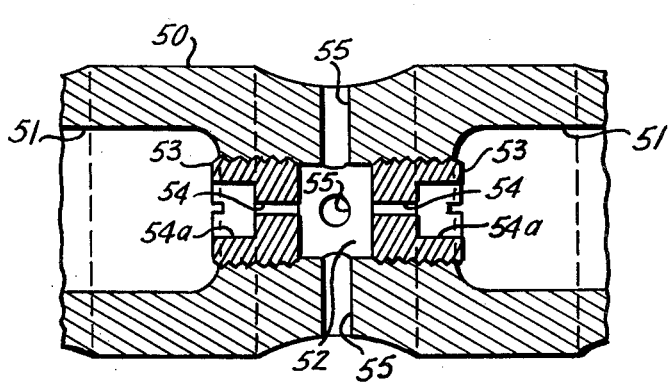
FIGURE 6 is a detail longitudinal sectional view through the valve spool of the servo valve.

The preferred material for the valve housing 21 is steel. Within the bore 23 of this valve housing there is mounted for limited longitudinal reciprocating movement a valve member or spool 50. The latter has its circumferential wall formed lengthwise of flattened sinusoidal shape, complementary to the flattened sinusoidal wall of the bore 24 in the valve housing 21. It is contemplated that this valve spool will be chromium plated. Pistons are frequently made of cast iron. The co-efficient of friction of cast iron on steel is .17. Due to this reduced co-efficient of friction between the bore 24 in the valve housing 21 and the chromium plated circumferential wall of the valve spool 50, the frictional resistance to movement of the valave spool is minimized. This is very important in a valve structure of this type, since rapid acceleration from the non-flow position in response to a relatively small applied force is a positive requirement. Moreover the wear resistant property of chromium plated surfaces is well known. Axially of the spool 50, there are formed enlarged bores 51—51, which extend from the ends of the spool to diametral planes on the opposite sides of the mid-diametral plane of the latter. The inner ends of the bores 51—51 are connected by an axial bore 52 in the spool, which is of reduced diameter and screw threaded at its opposite ends. Metering or flow restricting plugs 53—53 are mounted in the opposite screw threaded ends of the axial bore 52. These plugs have flow passages 54 formed by axial bores therethrough, which bores are enlarged at their ends by counterbores 54a. Along its mid-diametral plane, the spool 50 is formed with a plurality of radially positioned bores 55, four (4) of these being shown, which form passages between the axial bores 51—51 and the exterior of the spool. The spool is limited in its degree of reciprocatory movement in the opposite directions by stop screws 56, which have lock nuts 57 on their outer ends. These stop screws are mounted respectively in a screw threaded hole 14 in the vertical plate 13 on the tool slide and in a similar screw threaded hole 48 in the end plate 47, which holes are eccentrically positioned with respect to the axis of the spool 50, so that the stop screws will contact the respective ends of the latter between the axial bores 51 therein and the circumferential side wall, as shown in FIGURE 4. At their outer ends these screw threaded holes 14 and 48 are enlarged by counterbores 14a and 48a, respectively. The stop screws 56 carry double flanges 58—58 thereon, which are received in the counterbores 14a and 48a, respectively, and between which there are positioned sealing rings 59.

The servo valve housing 21 is formed along its transverse mid-plane with a radially extending bore 26, which is a fluid inlet passage to the bore 24 within the housing. This bore is enlarged at its outer end by a counterbore 26a and a sealing gasket 27 is received in the counterbore. A first connector block 60 is held in place by cap screws 64, which pass through holes 61 in the connector block and are received in aligned screw threaded holes 28 in the valve housing. The holes 61 are enlarged at their outer ends by counterbores 61a in which the heads of the cap screws 64 are freely received. In the connector block 60 there are formed a first bore 62, which is aligned with the bore 26 in the servo valve housing 21, and a second bore 63 at right angles to the bore 62 communicating with the latter to form a continuous flow passage through the connector block. A conduit 65 is received in the bore 63 at one end and at its other end in the screw hole 16 in the vertical plate 13 on the tool slide.

The servo valve housing is also formed along transverse planes intermediate the mid-plane and its respective ends with radially and longitudinally extending bores 29—29 in its side wall, which are oil passages between the bore 24 in the valve housing and the surrounding liquid tight compartment (not shown). These passages register respectively at their inner ends with the outermost concave loops of the sinusoidal surface of the spool 50. Similarly, the valve housing is formed with radially and vertically extending bores 30—30 in its side wall, which are also oil passages to and from the bore 24 in the housing. These latter passages register respectively at their inner ends with the innermost convex loops of the sinusoidal surface of the spool 50. Similarly, the valve housing is formed with radially and vertically extending bores 30—30 in its side wall, which are also oil passages to and from the bore 24 in the housing. These latter passages register respectively at their inner ends with the innermost convex loops of the sinusoidal surface of the spool 50. At their upper ends the bores 30—30 are enlarged by counterbores 30a, in which there are received sealing gaskets 31.

A second connector block 66 is mounted on the top of the valve housing 21. This latter connector block is partly held in place by a cap screw 72, which extends freely through a hole 67 formed centrally of the connector block and in a registering screw threaded hole 36 in the valve housing 21. At its upper end the hole 67 is enlarged by a counterbore 67a in which the head of the cap screw 72 is freely received. The connector block 66 is further held in place by a pair of dowel pins 71—71, which are received in pairs of aligned holes 32—32 in the valve housing 21 and 68—68 in the connector block. Fluid passages through the connector block 66 are comprised by vertically positioned bores 69—69 and horizontally positioned bores 70—70 which respectively intersect the bores 69—69 to form the continuous passages. Conduits 73 and 74 are respectively connected at one end in the bores 70—70 and extend to the opposite ends of a servo cylinder 75. This cylinder is secured to the vertical plate 13 on the tool slide by suitable bolts (not shown). The servo cylinder has a piston 76 reciprocably mounted therein and a piston rod 77 is connected at one end to the piston 76 and is slidably mounted in one end of the cylinder 75. This piston rod is attached at its other end to the stationary swivel plate (not shown) of the tool slide. A similar connection of a servo cylinder to a tool slide is also shown in my prior Patent Number 2,691,913.

Figure 3:
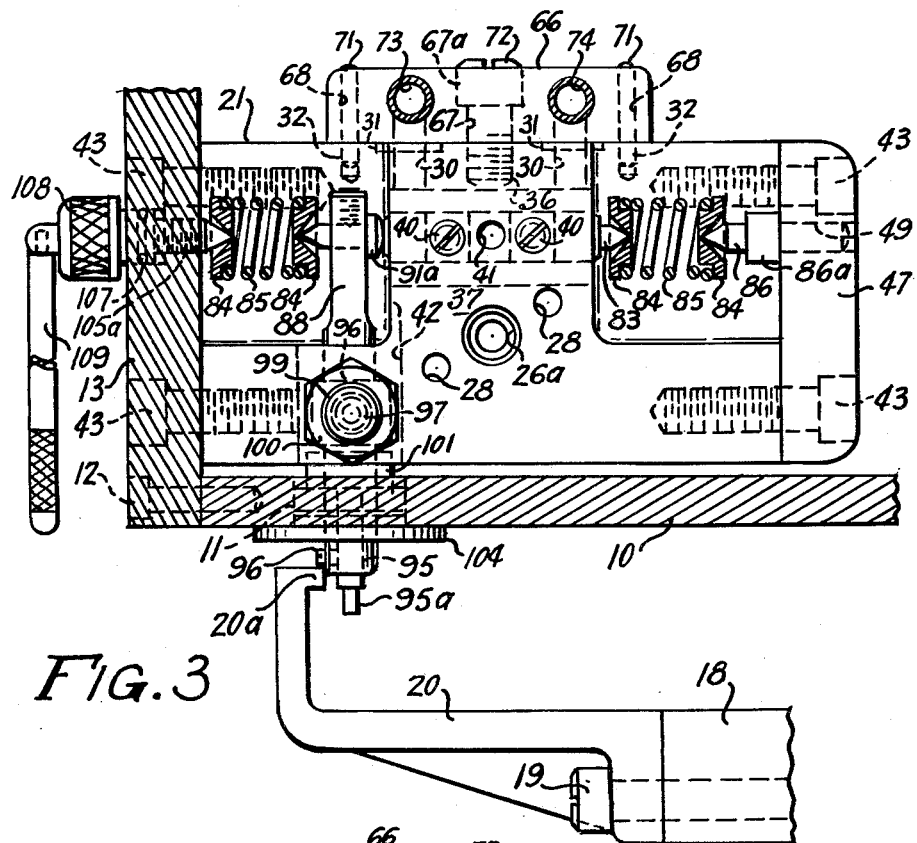
FIGURE 3 is a side elevational view, partly in section, taken on line 3—3 of FIGURE 2 and looking in the direction of the arrows.

The valve housing 21 is formed on one side with aligned longitudinally positioned bores 35—35, which extend from the respective ends of the housing and terminate short of the transverse mid-palne of the latter. Obliquely positioned bores 33—33 connect the chambers 23 and 25 in the valve housing respectively with the bores 35—35. These latter bores are closed at their outer ends and anterior to the junctures of the bores 33—33 respectively with the same by plugs 34—34. As shown in FIGURE 3, one side wall of the valve housing 21 is cut away along vertical planes parallel to and on the opposite sides of the transverse mid-plane and along horizontal planes slightly below the longitudinal mid-plane to form a substantially 90° boss 37 for housing the pilot valve and to provide spaces on the opposite sides of the boss for the components of the operating mechanism for the valve. The boss 37 has a lengthwise extending bore 38 therein. At the inner ends of the bores 35—35 in the valve housing, there are formed horizontally and radially positioned communicating bores 39—39, which extend through the boss 37. The outer ends of the bores 39—39 are closed by shouldered set screws 40—40. A valve sleeve 78 is received in the bore 38 in the boss 37. This valve sleeve has an axial bore 79 therethrough, the wall of which is formed as a flattened sinusoidal surface. Diametrically positioned bores 80—80 are formed through the valve sleeve 78 on the opposite sides of the transverse mid-plane of the latter. These bores 80—80 are aligned respectively at one end with the horizontally and radially positioned bores 39—39 in the valve housing 21 and provide communication between the longitudinally positioned bores 35—35 in the valve housing and the axial bore through the valve sleeve. At their other ends the bores 80—80 receive the reduced inner ends of the shouldered set screw 40—40, and thus hold the valve sleeve 78 against longitudinal movement in the bore 38 through the boss 37. Along its transverse mid-plane the valve sleeve 78 is formed with a radially positioned bore 81 which is aligned with a horizontally and radially positioned bore 41 in the boss 37 on the valve housing, to provide an exit passage from the axial bore 79 through the valve sleeve into the fluid tight compartment (not shown).

The valve member 82 is mounted within the axial bore 79 in the valve sleeve 78 for limited reciprocatory movement. This valve member has its circumferential side wall formed lengthwise as a flattened sinusoidal surface, complementary to the flattened sinusoidal surface of the bore 79 through the valve sleeve 78. The outermost concave loops of the sinusoidal surface on the valve member 82 are aligned respectively with the horizontally and radially positioned communicating bores 39—39 in the wall of the valve housing 21 and the registering bores 80—80 in the valve sleeve 78; similarly, the central convex loop of the sinusoidal surface on the valve member 82 is aligned with the horizontally and radially positioned bore 81 in the valve sleeve 78 and the registering bore 41 in the outer wall of the boss 37.

At one end the valve member 82 has a conical point 83 which may be integral therewith or a separate element having a pin thereon received in an axial hole in the valve member. This conical point 83 is received in a central conical indentation of one of a pair of disc members 84—84. Between the disc members 84—84 there is interposed a coiled compression spring 85 which is a loading spring. This spring has its ends flattened in planes at right angles to its axis. The second disc member 84 also receives a conical point 86 in its central indentation. This latter conical point has a shoulder 86a thereon, which abuts the inner face of the end plate 47, and at its outer end is received in a hole 49 in the end plate.

Figure 7:
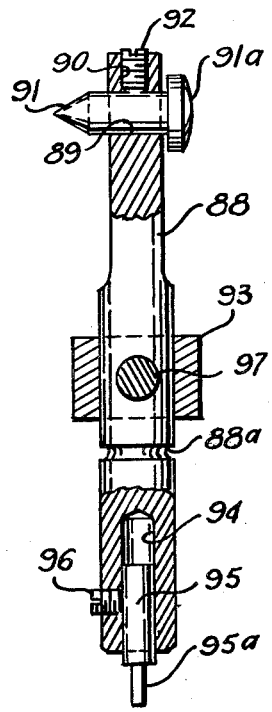
FIGURE 7 is a part elevational and a part sectional view, taken on the section line 7—7 of FIGURE 2 and looking in the direction of the arrows, showing the tracer operator for the pilot valve; and, FIGURE 8 is an exploded view showing the complementary valve seat and valve member surfaces in the valve housing and on the spool of the servo valve.

The tracer element is shown in detail in FIGURE 7. It consists principally of a lever in the form of a rod 88, which at its upper end has therein intersecting diametral and axial bores 89 and 90, respectively. A short rod 91 is mounted in the bore 89 and this rod has a conical point at one end and a head or button 91a at its other end. The axial bore 90 is screw threaded and the short rod 91 is held in place by a set screw 92 in this bore. The tracer element 88 is pivotally mounted, by a mounting to be now described, in a vertically positioned hole 42 in the valve housing 21 at one side of the boss 37 on the latter, and in an aligned hole 11 of the horizontal plate of the tool slide. The pivotal mounting is so arranged that the button 91a on the short rod 91 is in abutting engagement with the other end of the valve member 82 for transmitting the limited oscillatory movement of the tracer element, as will be later described, to the valve member as limited reciprocatory movement of the latter.

The pivotal mounting of the tracer element is comprised in part by a collar 93, which surrounds the lever 88 at approximately its midsection, and a shaft 97 having conical points at its opposite ends, which is positioned diametrically in aligned holes in the collar and rod. At one conical end the shaft 97 is pivotally supported at the shoulder between a bore 43 and a counterbore 43a in the valve housing 21; at its other conical end the shaft is pivotally supported at the shoulder between an axial bore 98 and a counterbore 98a in set screw 99. This set screw 99 is received in a screw threaded hole 44 in the valve housing 21 and a lock nut 100 is provided to assist in holding the set screw in place. A thimble 101 has an upper flange 101a with an axial hole therethrough which receives the lever 88 and a lower flange 101b which is received in the hole 11 in the horizontal plate 10 of the tool slide.

Below the collar 93 there is formed in the lever 88 a circumferential groove 88a in which is placed a sealing ring 102. This sealing ring cooperates with the upper flange 101a on the thimble 101 to prevent fluid from escaping through the hole 42 in the valve housing; similarly the lower flange 101b of the thimble 101 is provided with a circumferential groove in which is placed a sealing ring 103. This sealing ring cooperates with the hole 11, also to prevent fluid escaping through the hole 42 in the valve housing. A retainer plate 104 has a central hub 104a which is force fitted in the hole 11 in the horizontal platae 10 of the tool slide. The lower face of the flange 101b on the thimble 101 is a segment of a spherical surface so that the thimble may rock slightly in the hub 104a of the retainer plate during the limited oscillation of the lever 88.

At its lower end the lever 88 carries a tracer finger 95a. This tracer finger is integrally formed as a rod on a cylindrical element 95. The latter is mounted in an axial bore 94 in the lower end of the lever 88 and held in place by a set screw 96, which is received in a radially positioned screw threaded hole adjacent the lower end of the lever. The tracer finger 95a is positioned to contact a template (not shown), which is mounted on the lower horizontal platae 18 of the swivel tool slide. At the limit of its working stroke it may contact a stop 20a, which is carried by an arm 20 secured to the lower horizontal plate by a bolt 19.

A manual control for the valve member 82 is also provided. The conical point on the short rod 91 carried by the lever 88 is received in the central conical indentation of one of a second pair of disc members 84—84. Between these latter disc members there is also mounted a second coiled compression spring 85, which is an operating spring. This spring has its ends flat and in planes at right angles to its axis. The other disc member 84 of this latter pair receives in its central conical indentation a conical point on a screw threaded shaft 105a. This shaft 105a is rotatably mounted in a screw threaded hole 15 in the vertical plate 13 on the tool slide, which hole is enlarged at its outer end by a counterbore 15a. The shaft 105a is integrally formed with a hub 105 which is received in the counterbore 15a in the plate 13. A sealing ring 107 is mounted in a circumferential groove 106 in the hub 105 and cooperates with the counterbore 15a to prevent fluid from passing through the hole 18 in the vertical plate 13. At its outer end the hub 105 carries a knurled knob 108. The latter may be grasped by the operator to effect limited rotation of the screw threaded shaft 105a, that is to accomplish minute movement of the valve member 82. The knob 108 has integrally formed therewith a right angle handle 109. The latter may be grasped by the operator to effect rotation of the screw threaded shaft 105a through a greater arc, that is to accomplish more extensive travel of the valve member 82.

In operation, oil is supplied to the bore 24 in the valve housing 21 from a source under pressure, such as a pump (not shown), through the hole 16 in the vertically positioned plate 13 on the tool slide, the conduit 65, bores 63 and 62 in the connector block 64 and bore 26 in the valve housing 21. The oil passes through the radially positioned holes 55 in the valve spool 50, the axial bore 52 and the metering plugs 53—53 in the latter, and into the enlarged bores 51—51 and the chambers 23 and 25. Valve member 82 may be moved against the loading spring 85 either by oscillation of the lever 88 in contact with a template (not shown) or manual partial rotation of the knob 108 or handle 109. When the manual control element 108 or 109 is partially rotated in the clockwise direction (FIGURE 1), or when the tracer finger 95a on the lever 88 strikes a high spot on the template (not shown), the pilot valve member 82 is caused to move rearwardly, compressing the loading spring 85. Oil then enters the rear chamber 25, building up pressure in the latter, from the conduit 65, the bores 63 and 62 in the connector block 60, bore 26 in valve housing 21, the valve bore 24 in the housing 21, the radially positioned holes 55 in the valve spool 50, the axial bore 52 and the rear metering plug 53 and the enlarged bore 51 in the valve spool 50. This entry of the oil is provided for by the release of pressure from the forward valve chamber 23. This pressure is relieved by the oil escaping from the chamber 23 through the connecting bores 33, 35 and 39 in the valve housing 21, the radial bore 80 and axial bore 79 in the valve sleeve 78, and the radial bore 81 in the valve sleeve and the bore 41 in the valve boss 37. The resulting differential between the chambers 25 and 23 causes the valve spool 50 to move forwardly in the axial bore 24 in the valve housing, such movement being halted by the stop screw 50 on the vertical plate 13 of the tool slide. Oil under pressure also flows from the radially positioned holes 55 in the valve spool 50, through the axial bore 24 in the valve housing 21, the forward vertically positioned bore 30 (FIGURE 1) in the latter, the bores 69 and 70 in the connector block 66 and the conduit 73 to the forward end (FIGURE 1) of the servo cylinder 75. At the same time, pressure is relieved from the rear end of the servo cylinder 75 (FIGURE 1) through the conduit 74, through the bores 70 and 69 in the connector block 66, the rear vertical bore 30 (FIGURE 4) in the valve housing 21, the axial bore 24 in the housing 21, and the rear horizontally and radially positioned bore 29 in the valve housing. The piston 76 is moved by the pressure differential in the servo cylinder 75 to the rear of the latter and the piston rod 77 retracts the tool from the work, until the tracer finger 98a contacts the stop 20a, which is attached to the lower horizontal plate 18 of the tool slide.

Conversely, when the manual control 108 or 109 is partially rotated in the counter-clockwise direction (FIGURE 1), or when the tracer finger 95a on the lever 88 strikes a low spot on the template (not shown), the pilot valve member is caused to move forwardly against the action of the operating spring 88 by the expansion of the loading spring 85. Oil then enters the forward chamber 23, building up pressure in the latter, from the conduit 65, the bores 63 and 62 in the connector block 60, bore 26 in the valve housing 21, the valve bore 24 in the housing 21, the radially positioned holes 55 in the valve spool 50, the axial bore 52 and the forward metering plug 53 and the enlarged bore 51 in the valve spool 50. The entry of the oil is provided for by the release of pressure from the rear valve chamber 25. This pressure is relieved by the oil escaping from the chamber 25 through the connecting bores 33, 38 and 39 in the valve housing 21, the radial bore 80 and the axial bore 79 in the valve sleeve 78, and the radial bore 81 in the valve sleeve and the bore 41 in the valve boss 37. The resulting pressure differential between the chambers 23 and 25 causes the valve spool to move rearwardly in the axial bore 24 in the valve housing 21, such movement being halted by the stop screw 56 in the vertical end plate 47. Oil under pressure also flows from the radially positioned holes 55 in the valve spool 50, the forward vertically positioned bore 30 (FIGURE 4) in the latter, the bores 69 and 70 in the connector block 66, and the conduit 73 to the rear end (FIGURE 1) of the servo cylinder 75. At the same time, pressure is relieved from the front end of the servo cylinder 75, through the bores 70 and 69 in the connector block 66, the rear vertical bore 30 (FIGURE 4) in the valve housing 21, the axial bore 24 in the housing 21, and the front horizontally and radially positioned bore 29 in the valve housing. The piston 76 is moved by the pressure differential in the servo cylinder 75 to the front of the latter and the piston rod 77 carries the tool into engagement with the work.

The moduli of the operating and loading springs 85 are equal. This provides that a very slight force exerted by the tracer lever 88 or by the manual controls 108 or 109, is sufficient to shift the pilot valve element 82. It also provides that this valve element will seek an equilibrium or non-flow position as shown in FIGURE 1, wherein the outermost concave loops of the sinusoidal surface register with horizontally and radially positioned bores 39—39 in the valve housing 21 and the aligned bores 80—80 in the valve sleeve 78.

Figure 8:
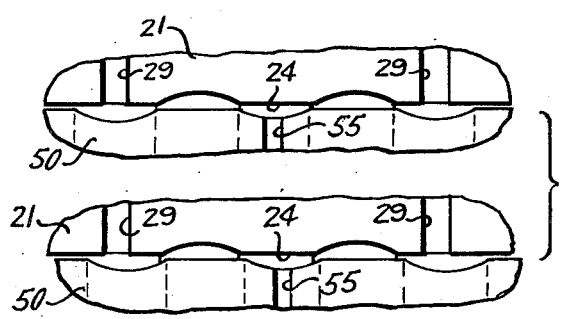

In the described movements of the valve spool 50 the lengthwise extending flattened sinusoidal surface on the latter cooperates with the lengthwise extending flattened sinusoidal surface of the axial bore 24 in the valve housing 21 to provide a gradual increase in the oil flow along the bore 24 during the opening movement, as shown in FIGURE 8; similarly, the out flow is gradually attenuated during the closing movement. This is fully shown by the enlarged fragmentary view of FIGURE 8 wherein it can be seen that when the valve spool 50 is in the non-flow position, as shown in the upper half of this figure, the concave loops of the sinusoidal surface of the axial bore 24 in the valve housing 21 register with the convex loops of the sinusoidal surface on the valve spool. As the valve spool 50 moves in either direction, for instance to the left, as shown in the lower half of FIGURE 8, the concave loops of the sinusoidal surface on the latter gradually move into registry with the convex loops of the sinusoidal surface of the axial bore 24 through the valve housing. It will thus be seen that the cross sectional area of the flow passage between the axial bore 24 and the circumference of the spool 50 is progressively increased and the velocity of the flow is accordingly uniformly accelerated; conversely, as the spool 50 moves in the opposite direction, the cross sectional area of the flow passage is progressively decreased and the velocity of the flow is uniformly attenuated.

It will therefore be apparent that the above described pilot and servo valve construction is a considerable improvement over the valve seats and valve members in the prior art constructions, where the complementary valve surfaces are at right angles to the axis of the valve seat and the reciprocatory valve member. As above described, the same principle is incorporated in the pilot valve.

Having now fully described my invention, what I claim as new and useful and desire to secure by Letters Patent of the United States is:

1. A hydraulic control valve for machine tools comprising a valve housing having a bore therein with a lengthwise extending flattened sinusoidal surface, portions of said valve housing defining enlarged chambers at opposite ends of the bore, and a reciprocable valve spool in said bore having a complementary legnthwise extending flattened sinusoidal surface.

2. A hydraulic control valve for machine tools comprising a valve housing having a bore therein with a lengthwise extending flattened sinusoidal surface, portions of said valve housing defining enlarged chambers at opposite ends of the bore, end plates on said valve housing, a reciprocable valve spool in said bore having a complementary lengthwise extending flattened sinusoidal surface, and stops mounted in said end plates and engageable with said valve spool for limiting reciprocation of the same in either direction to the base length of a loop of said sinusoidal surfaces.

3. A hydraulic control valve for machine tools comprising a valve housing having a bore therein with a lengthwise extending flattened sinusoidal surface, portions of said valve housing defining enlarger chambers at opposite ends of the bore, and a reciprocable valve spool in said bore having a complementary lengthwise extending flattened sinusoidal surface and having axial bores extending from its opposite ends and radial holes communicating with said axial bores.

4. A hydraulic control valve for machine tools comprising a valve housing having a bore therein with a lengthwise extending flattened sinusoidal surface, portions of said valve housing defining enlarged chambers at opposite ends of the bore, end plates on said valve housing, and a reciprocable cylindrical valve spool in said bore having a complementary lengthwise extending flattened sinusoidal surface and having axial bores extending from its opposite ends and radial holes communicating with said axial bores, and stops mounted in said end plates for contacting the ends of the valve spool between the axial bores and its circumference to limit the reciprocation of the latter in the opposite directions.

5. A hydraulic control valve for machine tools comprising a valve housing having a bore therein with a lengthwise extending flattened sinusoidal surface, portions of said valve housing defining enlarged chambers at opposite ends of the bore, and a reciprocable valve spool in said bore having a complementary lengthwise extending flattened sinusoidal surface and having enlarged axial bores extending from its opposite ends, a central axial bore interconnecting said enlarged axial bores, radial holes communicating with said central bore, and metering plugs in said central axial bore.

6. A hydraulic control valve for machine tools comprising a valve housing having a bore therein with a lengthwise extending flattened sinusoidal surface, portions of said valve housing defining enlarged chambers at opposite ends of the bore, a reciprocable valve spool in said bore having a complementary lengthwise extending flattened sinusoidal surface, a pilot valve in said housing, and passages formed in the housing providing communication between the pilot valve and the enlarged chambers in the valve housing at the opposite ends of the bore.

7. A hydraulic control valve for machine tools comprising a valve housing having a large bore therein with a lengthwise extending flattened sinusoidal surface and a small bore therein also with a lengthwise extending flattened sinusoidal surface, portions of said valve housing defining an enlarged chamber at opposite ends of said large bore, a reciprocable valve spool in said large bore having a complementary lengthwise extending flattened sinusoidal surafce, a pilot valve in said small bore having a complementary lengthwise extending flattened sinusoidal surface, and passages formed in the housing providing communication between the pilot valve and the enlarged chambers in the valve housing at the opposite ends of the large bore.

8. A hydraulic control valve for machine tools comprising a valve housing having a bore therein with a lengthwise extending flattened sinusoidal surface, portions of said valve housing defining an enlarged chamber at opposite ends of the bore, a reciprocable valve spool in said bore having a complementary lengthwise extending flattened sinusoidal surface, a pilot valve in said housing, passages formed in the housing providing communication between the pilot valve and the enlarged chambers in the valve housing at the opposite ends of the bore, and a loading spring mounted in said housing and abutting the pilot valve for biasing same to movement in one direction through the housing.

9. A hydraulic control valve for machine tools comprising a valve housing having a bore therein with a lengthwise flattened sinusoidal surface, portions of said valve housing defining an enlarged chamber at opposite ends of the bore, a reciprocable valve spool in said bore having a complementary lengthwise extending flattened sinusoidal surface, a pilot valve in said housing, passages formed in the housing providing communication between the pilot valve and the enlarged chambers in the housing at the opposite ends of the bore, a loading spring mounted in said housing and abutting the pilot valve, and a lever pivotally mounted in said housing adapted to contact a template at one end and abutting the pilot valve at the other end for moving same against the action of the loading spring.

10. A hydraulic control valve for machine tools comprising a valve housing having a bore therein with a lengthwise flattened sinusoidal surface, portions of said valve housing defining an enlarged chamber at opposite ends of the bore, a reciprocable valve spool in said bore having a complementary lengthwise extending flattened sinusoidal surface, a pilot valve in said housing, passages formed in the housing providing communication between the pilot valve and the enlarged chambers in the housing at the opposite ends of the bore, a loading spring mounted in said housing and abutting the pilot valve, and a shaft rotatably mounted in said housing and operatively connected to the pilot valve for moving same against the action of the loading spring.

11. A hydraulic control valve for machine tools comprising a valve housing having a bore therein with a lengthwise flattened sinusoidal surface, portions of said valve housing defining an enlarged chamber at opposite ends of the bore, a reciprocable valve spool in said bore having a complementary lengthwise extending flattened sinusoidal surface, a pilot valve in said housing, passages formed in the housing providing communication between the pilot valve and the enlarged chambers in the housing at the opposite ends of the bore, a loading spring mounted in said housing and abutting the pilot valve, a shaft rotatably mounted in said housing, and an operating spring between said shaft and said pilot valve for transmitting the rotation of the former to reciprocation of the latter against the action of the loading spring.

12. A hydraulic control valve for machine tools comprising a valve housing having a bore therein with a lengthwise flattened sinusoidal surface, portions of said valve housing defining an enlarged chamber at opposite ends of the bore, a reciprocable valve spool in said bore having a complementary lengthwise extending flattened sinusoidal surface, a pilot valve in said housing, passages formed in the housing providing communication between the pilot valve and the enlarged chambers in the housing at the opposite ends of the bore, a loading spring mounted in said housing and abutting the pilot valve, a lever pivotally mounted in said housing adapted to contact a template at one end and abutting the pilot valve at the other end for moving same against the action of the loading spring, and a shaft rotatably mounted in said housing and operatively connected to the pilot valve for likewise moving same against the action of said loading spring.

13. A hydraulic control valve for machine tools comprising a valve housing having a bore therein with a lengthwise flattened sinusoidal surface, portions of said valve housing defining an enlarged chamber at opposite ends of the bore, a reciprocable valve spool in said bore having a complementary lengthwise extending flattened sinusoidal surface, a pilot valve in said housing, passages formed in the housing providing communication between the pilot valve and the enlarged chambers in the housing at the opposite ends of the bore, a loading spring mounted in the housing and abutting the pilot valve, a lever pivotally mounted in said housing, adapted to contact a template at one end and abutting the pilot valve at the other end for moving same against the action of the loading spring, a shaft rotatably mounted in said housing, and an operating spring between said shaft and said pilot valve for transmitting the rotation of the former to reciprocation of the latter also against the action of said loading spring.

References Cited in the file of this patent

UNITED STATES PATENTS

| | | |
|---|---|---|
| 2,709,421 | Avery | May 31, 1955 |
| 2,846,981 | Kambic | Aug. 12, 1958 |
| 3,023,781 | Larsen | Mar. 6, 1962 |

FOREIGN PATENTS

| | | |
|---|---|---|
| 810,471 | Great Britain | Mar. 18, 1959 |